United States Patent
Dai et al.

(10) Patent No.: US 10,113,110 B2
(45) Date of Patent: Oct. 30, 2018

(54) BORON-LOADED LIQUID SCINTILLATOR COMPOSITIONS AND METHODS OF PREPARATION THEREOF

(71) Applicant: ATOMIC ENERGY OF CANADA LIMITED, Chalk River (CA)

(72) Inventors: Xiongxin Dai, Deep River (CA); Bhaskar Sur, Deep River (CA); Ghaouti Bentoumi, Petawawa (CA); Liqian Li, Deep River (CA); Guy Jonkmans, Deep River (CA)

(73) Assignee: ATOMIC ENERGY OF CANADA LIMITED, Chalk River, Ontario (CA)

( * ) Notice: Subject to any disclaimer, the term of this patent is extended or adjusted under 35 U.S.C. 154(b) by 74 days.

(21) Appl. No.: 14/379,181

(22) PCT Filed: Feb. 15, 2013

(86) PCT No.: PCT/CA2013/000123
§ 371 (c)(1),
(2) Date: Aug. 15, 2014

(87) PCT Pub. No.: WO2013/120175
PCT Pub. Date: Aug. 22, 2013

(65) Prior Publication Data
US 2015/0014588 A1    Jan. 15, 2015

(30) Foreign Application Priority Data
Feb. 15, 2012    (CA) ..................................... 2767658

(51) Int. Cl.
*C09K 11/02* (2006.01)
*C09K 11/06* (2006.01)
(Continued)

(52) U.S. Cl.
CPC ............ *C09K 11/025* (2013.01); *C09K 11/02* (2013.01); *C09K 11/06* (2013.01)

(58) Field of Classification Search
CPC ....... C09K 11/02; C09K 11/025; C09K 11/06; C09K 2211/1018; G01T 1/2042;
(Continued)

(56) References Cited

U.S. PATENT DOCUMENTS 5,308,544 A    5/1994 Dodson
5,606,638 A *  2/1997 Tymianski ............. G01T 1/203
                                              250/368

(Continued)

FOREIGN PATENT DOCUMENTS

EP          0615139 A1     9/1994
WO    WO 2010144227 A2 * 12/2010 ........... G01T 1/2002

OTHER PUBLICATIONS

Huang et al., "Study of attenuation length of linear alkyl benzene as LS solvent", Aug. 31, 2010, Jinst, IOP Publishing for SISSA, 13 pages.*

(Continued)

*Primary Examiner* — Matthew E. Hoban
*Assistant Examiner* — Lynne Edmondson
(74) *Attorney, Agent, or Firm* — Nixon Peabody LLP; David S. Resnick; Nicole D. Kling (57) ABSTRACT

Described herein is a boron-loaded liquid scintillator composition comprising a scintillation solvent including at least one linear alkylbenzene (LAB), diisopropyl naphthalene (DIN) or phenylxylyl ethane (PXE), or a combination of one or more thereof; at least one boron-containing material; one or more fluors, such as 2,5-diphenyloxazole (PPO), and optionally one or more wavelength shifters, such as 1,4-bis[2-methylstyryl]benzene (bis-MSB). The boron-containing material may comprise a carborane, such as o-carborane, (Continued)

especially those enriched in Boron-10. Methods of preparation of the liquid scintillator composition are also described, as well as concentrates thereof.

15 Claims, 5 Drawing Sheets

(51) Int. Cl.
*G01T 1/204* (2006.01)
*C07F 5/02* (2006.01)

(58) Field of Classification Search
CPC ....... G01T 1/204; G01T 1/2033; C07F 5/025; C07F 5/04; C07F 5/027; A61K 31/69; A61K 33/22
USPC .......... 252/301.17, 301.36; 250/390.11, 367, 250/269.4, 370.05
See application file for complete search history.

(56) References Cited

U.S. PATENT DOCUMENTS

| | | | | |
|---|---|---|---|---|
| 7,372,041 | B1* | 5/2008 | Nagarkar | G01T 3/06 250/390.11 |
| 2010/0314556 | A1* | 12/2010 | Hamel | C07D 221/14 250/459.1 |
| 2011/0114843 | A1* | 5/2011 | Kusner | G01T 1/2018 250/361 R |

OTHER PUBLICATIONS

Bentoumi, G. et al., 32nd Annual Conference of the Canadian Nuclear Society and 35th CNS/Can Student Conference 2011, vol. 1:352-361 (2011), Abstract. "Simulation and Design of a Neutron Detector Based on Boron-Loaded Linear Alkyl Benzene (LAB) Liquid Scintillator."

Bentoumi. G. et al., Nuclear Instruments and Methods in Physics Research A, 701:221-224 (Feb. 2013) available online Nov. 10, 2012. "Characterization of a Liquid Scintillator Based on Linear Alkyl Benzene for Neutron Detection."

Marrodan Undagoitia. T. et al., Review of Scientific Instruments., 80:43301-1-43301-8 (2009). "Fluorescence Decay-Time Constants in Organic Liquid Scintillators."

Nemchenok, I. B. et al., Physics of Particles and Nuclei Letters. 8(2):129-135 (2011). "Liquid Scintillator Based oil Linear Alkylbenzene."

Shestakova. I. et al., IEEE Transactions on Nuclear Science, 54(5):1797-1800 (2007). "A High Spatial Resolution Sensor for Thermal Neutron Imaging."

Swiderski. L. et al., IEEE Transactions on Nuclear Science 57(1):375-380 (2010). "Further Study of Boron-10 Loaded Liquid Scintillators for Detection of Fast and Thermal Neutrons."

Thomson, J., 2nd Liquid Scintillation Users' Forum (Apr. 2003), 38 slides retrieved at: htto://www.nol.co.uk/uoload/pdf/20030402 Isuf thomson 1.pdf. "1-Sample Preparation & Liquid Scintillation Counting."

Thomson, J., 2nd Liquid Scintillation Users' Forum (Apr. 2003), 36 slides retrieved at: htto://ww-w.nol.co.u.k/uoload/pdf/20030402 Isuf thoinson5 1.pdf. "The Evolution of LSC Cocktails and Safety."

Ya-Yon, D. et al., American Institute of Physics Conference Proceedings, Vo. 1235, Abstract (Nov. 2009). abstract "Preparation of a Gd Loaded Liquid Scintillator for Dana Bay Neutrino Experiment."

* cited by examiner

BORON-LOADED LIQUID SCINTILLATOR COMPOSITIONS AND METHODS OF PREPARATION THEREOF

CROSS REFERENCE TO RELATED APPLICATIONS

This Application is a 35 U.S.C. § 371 National Phase Entry Application of International Application No. PCT/CA2013/000123 filed Feb. 15, 2013, which designates the U.S., and which claims benefit under 35 U.S.C. § 119 to Canadian Application No. 2,767,658 filed Feb. 15, 2012, the contents of each of which are incorporated herein by reference in their entirety.

FIELD OF INVENTION

The present invention relates to boron-loaded liquid scintillator compositions, and their methods of preparation. In particular, the invention relates to boron-loaded liquid scintillator compositions which have desirable neutron detection and safety properties.

BACKGROUND OF THE INVENTION

Neutron detectors are used to detect and discriminate neutrons in ambient gamma and beta radiation fields. Such applications include monitoring neutrons in and around nuclear reactors for reactor control, reactor safety, reactor monitoring, nuclear material (fuel) accountancy, and radiological protection. Neutron detectors can also be used in security applications for detection of contraband fissionable materials, for industrial applications such as neutron radiography and tomography, for scientific research including neutron scattering and particle accelerator experiments in nuclear physics and material science investigations, and for detection of exotic particles such as neutrinos and dark matter.

There are currently several types of media for detecting neutrons. These include media which use Helium-3 gas, boron coated particles, boron trifluoride gas, lithium coatings or foils, solid or glass scintillators loaded with a neutron-reactive element (such as lithium, boron or gadolinium), and boron-loaded liquid scintillators.

Helium-3 filled ionization chamber tubes have been extensively used in the field because of their good neutron-to-gamma discrimination capability. However, there is currently a global shortage of Helium-3. As a result, it is necessary to design new neutron detectors relying on other mechanisms, and that are as effective as He-3 detectors.

The boron-10 capture process has been suggested. With a cross section of 3838 barns, an incident thermal neutron may be captured by boron-10 and produces Lithium-7 and alpha as follows [1]:

Lithium-7 and alpha particle have a short range and will deposit their energies into the surrounding medium. If the environment is a scintillator, a considerable number of optical photons can be emitted following this interaction. The optical photons are easily transformed to an electrical pulse by a photomultiplier for processing and achieving an efficient neutron detector. Therefore, this interaction is monitored to count neutrons.

U.S. Pat. No. 3,372,127 to Thomas et al. describes several boron-loaded liquid scintillator compositions. These compositions comprise enriched trimethyl borate (0.95 $B^{10}$) and isopropyl biphenyl with varying amounts of either naphthalene or 1,4-di-[2-(5-phenyloxazolyl)]-benzene, and either 2-phenyl-5-(4-biphenylyl)-1,3,4-oxadiazole, 2-(1-naphthyl)-5-phenyloxazole or 9,10-diphenyl anthracene. However, scintillator compositions such as those described by Thomas et al. have several drawbacks. For instance, they typically contain a high content of trimethyl borate, which is unstable when exposed to moisture, is flammable, and yields a low light output or signal. In addition, many liquid scintillators, and particularly boron loaded liquid scintillators, use toxic and flammable liquid scintillation solvents, which are difficult to handle and incorporate into detectors. Furthermore, because the light output of these liquid scintillators is low, it is more difficult to discriminate neutron signal from noise and gamma-beta background radiation.

Accordingly, there is a need for new and improved liquid scintillators which are effective for neutron detection.

SUMMARY OF THE INVENTION

It is an object of the invention to provide an improved liquid scintillator composition, which is capable of detecting neutrons and discriminating the neutron signals against gamma and beta radiation.

In certain preferred embodiments the detection medium can be prepared at low-cost, is highly efficient, and is safe to use.

According to an aspect of the present invention there is provided a boron-loaded liquid scintillator composition comprising: a scintillation solvent including at least one linear alkylbenzene (LAB), diisopropyl naphthalene (DIN) or phenylxylyl ethane (PXE), or a combination of one or more thereof; at least one boron-containing material; one or more fluors; and optionally one or more wavelength shifters.

As a further aspect of the invention, there is also provided a method for preparing a boron-loaded liquid scintillator composition, comprising: obtaining a scintillation solvent including at least one linear alkylbenzene (LAB), diisopropyl naphthalene (DIN), or phenylxylyl ethane (PXE), or a mixture of any one or more thereof; obtaining at least one boron-containing material; obtaining one or more fluors; optionally obtaining one or more wavelength shifters; and mixing in effective amounts to obtain the boron-loaded liquid scintillator composition.

In addition, as a further aspect of the invention, there is provided a boron-loaded liquid scintillator concentrate, which comprises a scintillation solvent including at least one of linear alkylbenzene (LAB), diisopropyl naphthalene (DIN), phenylxylyl ethane (PXE), or a combination of one or more thereof, at least one boron-containing material, one or more fluors, and optionally one or more wavelength shifters.

Further embodiments and details of the invention are described below.

BRIEF DESCRIPTION OF THE DRAWINGS

These and other features of the invention will become more apparent from the following description in which reference is made to the appended drawings, wherein.

DETAILED DESCRIPTION

Described herein is a boron-loaded liquid scintillator comprising carborane, a scintillation solvent such as linear alkylbenzene (LAB), diisopropyl naphthalene (DIN) or phenylxylyl ethane (PXE), at least one fluor, and optionally at least one wavelength shifter.

Currently available boron-loaded liquid scintillators use scintillation solvents and boron ingredients which are hazardous in nature, for instance to obtain adequate light output, or to discriminate neutron signal from noise and gamma-beta background radiation. The present inventors have therefore investigated alternative solvents, including LAB, DIN, and PXE, which are considered to be safer to use than the commonly used solvents, as well as different boron ingredients.

Accordingly, the invention described herein relates to a boron-loaded liquid scintillator comprising a scintillation solvent including at least one of linear alkylbenzene (LAB), diisopropyl naphthalene (DIN), phenylxylyl ethane (PXE), or a combination of one or more thereof, a boron-containing material, at least one fluor, and optionally at least one wavelength shifter.

In certain non-limiting embodiments, the boron-containing material is a carborane. In a further embodiment, the carborane is ortho-, or o-carborane. In other embodiments, it may be preferred for the boron-containing material, e.g. carborane, to be enriched with the Boron-10 isotope. For example, yet without wishing to be limiting in any way, o-carborane can be used containing natural boron, which contains approximately 19.2% Boron-10. In other embodiments, the boron-containing material (e.g. o-carborane) may be enriched with up to 90% boron-10 or more. Other boron-containing materials (e.g., Trimethyl borate) may also be used, although Trimethyl borate is less desirable due to its instability.

Scintillation light output is enhanced by adding certain compositions of at least one fluor and optionally at least one wavelength shifter, or both. One non-limiting example of a fluor is 2,5-diphenyloxazole (PPO), although other fluors are envisioned such as p-terphenyl (pTP), 2-phenyl-5-(4-biphenylyl)-1,3,4-oxadiazole (PBD), 2-(4'-tert-butylphenyl)-5-(4"-biphenylyl)-1,3,4-oxadiazole (butyl PBD), 2,5-diphenyl-1,3,4-oxadiazole (PPD), 2-(4-biphenylyl)-1,3,4-oxadiazole (PBO), and 2,5-bis-2-(5-T-butyl-benzoxazolyl)-thiophene (BBOT). One non-limiting example of a wavelength shifter is 1,4-bis[2-methylstyryl]benzene (bis-MSB), although other wavelength shifters are also envisioned, such as 1,4-bis-2-(5-phenyloxazolyl)benzene (POPOP), dimethy POPOP, 2-(1-naphthyl)-5-phenyloxazole (NPO), 2-(4-biphenyl)-5-phenyloxazole (BPO), and 2-(4'-biphenylyl)-6-phenylbenzoxazole (PBBO).

In a preferred embodiment, the scintillation solvent is LAB, and is defined by the following general formula:

wherein n is an integer from 10 to 16, including the integers 10, 11, 12, 13, 14, 15, and 16. In certain embodiments, which are not to be considered limiting in any way, n may be an integer from 10 to 15, or 12 to 15, or 12 to 13, or 10 to 13. In one exemplary, yet non-limiting embodiment, the LAB may be a commercially obtained LAB such as PETRELAB™.

In a further preferred embodiment, the composition comprises LAB, o-carborane, 2,5-diphenyloxazole (PPO), and 1,4-bis[2-methylstyryl]benzene (bis-MSB). Without wishing to be limiting, the amount of LAB in this preferred composition may range from approximately 80% to 99% (w/w), more preferably from approximately 90% to 99% w/w, and most preferably 92% w/w. With respect to o-carborane, the relative amount may, without being limiting, range from approximately 0.5% to 15% w/w, more preferably 1% to 10% w/w, and most preferably 7% w/w. The PPO and bis-MSB may be provided in amounts ranging from approximately 0.01-15 g/L for PPO and 0-100 mg/L for bis-MSB, with preferred amounts typically depending on detector arrangement. However, in certain detector arrangements 1-10 g/L, or even 2-6 g/L PPO will be desirable, and 10-60 mg/L, or even 20-40 mg/L bis-MSB may be advantageous.

It is further to be understood that compositions according to the present invention may be prepared as concentrates for dilution, for instance, with a solvent such as LAB, DIN or PXE, or supplied as one or more separate reagents to be mixed according to a preparatory method.

Accordingly, the present invention further relates to a method for the preparation of a boron-loaded liquid scintillator. The method comprises mixing a scintillation solvent including linear alkylbenzene (LAB), diisopropyl naphthalene (DIN), phenylxylyl ethane (PXE) or a mixture of any one or more thereof, with a boron-containing material. The scintillation solvent and boron-containing material are discussed in further detail above. At least one fluor, and optionally at least one wavelength shifter are also added in desired amounts. These amounts, and the specific fluors and wavelength shifters that can be used in the method are also described above in connection with the described compositions.

In one particular embodiment of the above-described method the scintillation solvent comprises LAB and the boron-containing material comprises o-carborane, and the o-carborane is dissolved in LAB to prepare a mixture. At least one fluor and optionally at least one wavelength shifter is dissolved in LAB, and this is mixed into the mixture of LAB and o-carborane.

The above-described method can be carried out in a number of ways as would be known to one of ordinary skill in the art. For instance, mixing of the components may be carried out at room temperature, or increased temperatures and stirring may be used to make the dissolution faster. In addition, the particular order of addition of the constituent reagents may be modified in accordance with the usual knowledge of those skilled in the art.

The invention also relates to a boron-loaded liquid scintillator concentrate, which comprises scintillation solvent including at least one of linear alkylbenzene (LAB), diisopropyl naphthalene (DIN), phenylxylyl ethane (PXE), or a combination of one or more thereof, a boron-containing material, one or more fluors, and optionally one or more wavelength shifters.

Examples and embodiments of the scintillation solvents, boron-containing materials, fluors, and wavelength shifters are further described above.

In a preferred embodiment of the boron-loaded liquid scintillator concentrate, LAB, o-carborane, PPO and bis-MSB are present in a concentrated mixture which allows for dilution to reach a concentration as follows:

| Ingredient | Concentration |
| --- | --- |
| LAB | 80-99% |
| o-Carborane | 0.5-15% |
| PPO | 0.01-15 g/L |
| bis-MSB | 0-100 mg/L |

In a further preferred embodiment, the LAB, o-carborane, PPO and bis-MSB are present in a concentrated mixture which allows for dilution to reach a concentration as follows:

| Ingredient | Concentration |
| --- | --- |
| LAB | 90-99% |
| o-Carborane | 1-10% |
| PPO | 1-10 g/L |
| bis-MSB | 10-60 mg/L |

In yet another embodiment, the LAB, o-carborane, PPO and bis-MSB are present in a concentrated mixture which allows for dilution to reach a concentration as follows:

| Ingredient | Concentration |
| --- | --- |
| LAB | 92% |
| o-Carborane | 7% |
| PPO | 2-6 g/L |
| bis-MSB | 20-40 mg/L |

Without wishing to be limiting in any way, it is envisioned that the above-described concentrate may be diluted for use by the end user, or prior to use by the end user, and using any one of the components of the mixture for end use. In certain non-limiting embodiments, the concentrate may be diluted to the end concentration with linear alkylbenzene (LAB), diisopropyl naphthalene (DIN), phenylxylyl ethane (PXE), or a combination of any one or more thereof.

The following examples are put forth so as to provide those of ordinary skill in the art with a complete disclosure and description of how the compositions and methods claimed herein are made and performed, and are intended to be purely exemplary of the invention and are not intended to limit the scope of what the inventors regard as their invention.

EXAMPLES

Example 1: Evaluation of Linear Alkyl Benzene (LAB) as Solvent

Figure 1:
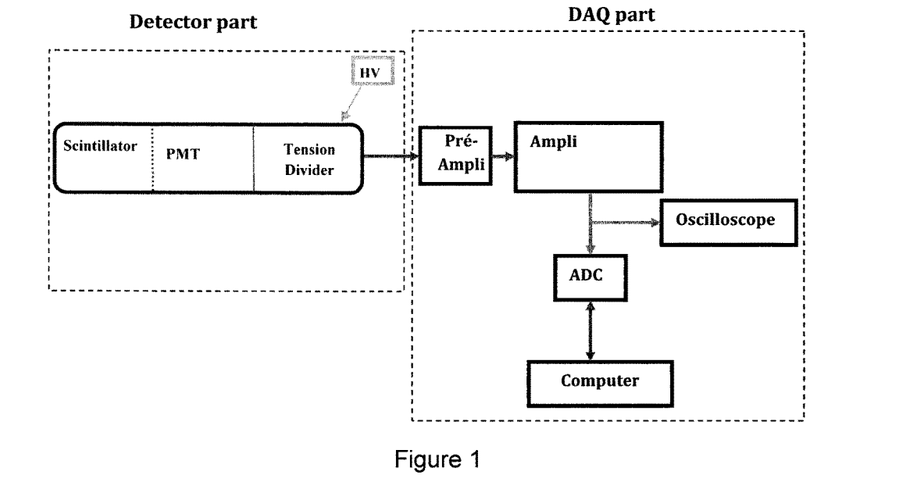
FIG. 1 illustrates the experimental setup for scintillator characterization.

The liquid scintillator (LS) used in all the experiments is based on linear alkyl benzene (LAB) solvent and the fluors 2,5-diphenyloxazole (PPO) and bis-methylstyrylbenzene (Bis-MSB) with the concentrations of 3 g/L and 20 mg/L, respectively. FIG. 1 shows a scheme of the experimental setup. The LS is filled into a 1 inch diameter glass cylinder. In order to maximize optical photon collection, grease was used in-between the container and the PMT's window while the remaining faces of the container were wrapped by an aluminum foil. Under radiation excitation, the energy released in the scintillator by the incident particle transforms to a certain number of optical photons. This number has been estimated conservatively for our scintillator to 1055 photons by absorbed neutron (M. Yeh, A. Garnov, and R. L. Hahn, *Nuclear instruments and Methods in physics Research A*, vol. 578, pp. 329-339, 2007; A. G. Piepke, S. W. Moser, and V. M. Novikov, *Nuclear Instruments and Methods in Physics research A*, vol. 432, pp. 392-398, 1999). A photomultiplier then converts a fraction of the optical photons to a measurable electrical pulse. For the energy spectrum collection, the signal from the PMT is connected directly or after amplification to a versa module Europa (VME)-based electronic setup for data acquisition (DAQ). It has the function of processing and classifying the electrical pulses according to their surfaces. Its main component is the analog/digital converter (ADC) SIS3320 from Struck Innovative Systeme (http://www.struck.de/). C++ based software has been developed to control all operation and data readout and recording. When the height of the electrical pulse exceeds the threshold level, a set of mathematical operations is triggered into the ADC module to calculate the area of the pulse. The result is then transferred to the computer to build-up a histogram of the pulse's surface. After calibration, a spectrum is obtained representing the intensities versus the energy of the incident particles. Based only on this spectrum, it is impossible to identify without ambiguity two different particles that deposit the same energy into the scintillator. One of the proposed techniques to achieve discrimination between neutron and gamma ray is the pulse shape discrimination (PSD). It requires a temporal resolution of the order of the nanosecond (L. F. Miller1, J. Preston, S. Pozzi, and M. Flaska and J. Neal2, *Radiation Protection Dosimetry*, vol. 126, p. 253, 2007). For this experiment, the signal from the PMT has been connected into the Tektronix oscilloscope DPO 7254 that has a sampling rate of up to 10 GS/s. The oscilloscope has been configured to record only the two successive pulses resulting from alpha and beta particles within a window of 500 ns. Nearly 2000 spectra have been recorded for off-line processing and analysis.

The experimental system could be tested either with an external neutron source or with an internal radioactive source loaded into the scintillator. Pb-212, which is an alpha and beta emitter, has been loaded into the liquid scintillator and a sample with an activity of 50 Bq has been obtained. It has the advantage of simulating the interactions of neutron and gamma ray capture at the same time and for the same conditions.

Figure 2:
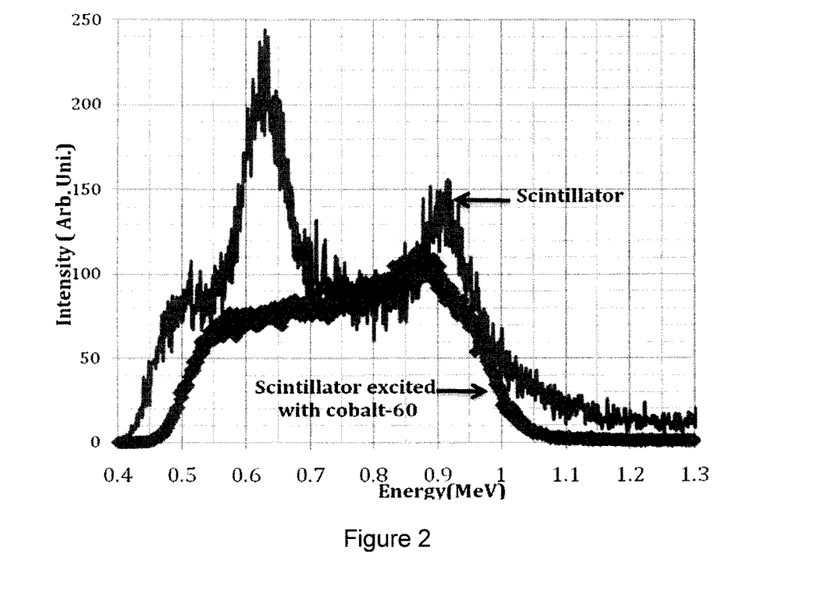
FIG. 2 illustrates the Pb-212 energy spectrum detected by a linear alkylbenzene (LAB) based scintillator.

FIG. 2 shows the Pb-212 energy spectrum released into the liquid scintillator and collected with the DAQ system. The spectrum was calibrated using Cobalt-60, Barium-133, and Cesium-137 gamma sources. The spectrum is dominated by two well defined peaks at approximately 0.6 and 0.9 MeV and a continuum background. Looking at the Pb-212 decay chain (B. R. S. Minty, *AGSO Journal of Australian Geology and Geophysics*, 17(2), 39-50 (1997)), the two peaks can be attributed to alpha particles with energies 6.2 and 8.95 MeV. The first one has emitted subsequent to the decay of Bi-212 while the other results from the decay of Po-212. We notice that there is a quenching factor of approximately 10 between the electron (beta) and the alpha particle. This value corresponds with reported values (Donald L. Horrocks, *The review of scientific instruments*, vol. 35, no. 3, p. 334, March 1964; K. F. Flynn, L. E. Glendenin, and E. P. Steinberg and P. M. Wright, *Nuclear Instruments and Methods*, Vol. 27, P. 13, 1964). The background is indeed attributed to the different beta particles released during the Pb-212 decay. It is expected that the beta particles have a continuum energy emission with maximum intensity at around 0.15 MeV.

Furthermore, the alpha particle at 8.95 MeV has a twice greater chance of being emitted than the alpha at 6.208 MeV. This should be reflected in the energy spectrum with a peak at 8.95 MeV that is twice high as that at 6.208 MeV. However, as shown in FIG. 2, a very different trend is observed experimentally. This result could be explained by the fact that the alpha particle at 8.955 MeV always follows a beta emission. Consequently, if a beta particle is emitted with a relatively high energy and produces an electrical pulse above the threshold level, the DAQ system triggers the beta event to be recorded and classified. A dead time of the order of a microsecond is required for the electronic system to recover its full capacity and be rearmed for a new event. During this time, the probability for an alpha emission at 8.955 MeV is relatively high. Given that Po-212 has a half-life of 299 ns, there is a probability greater than 50% that the alpha is emitted within a period of 299 ns. This makes it difficult, if not impossible, for the DAQ system to be ready for the emitted alpha particle. Thus most of the alpha events at 8.95 MeV are not registered and will not contribute to the histogram in FIG. 2.

Figure 3:
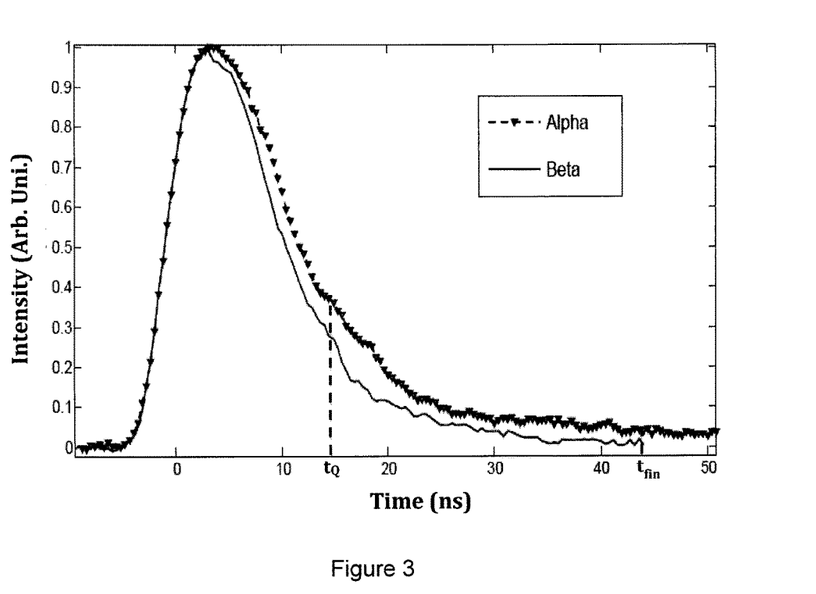
FIG. 3 is a plot showing alpha and beta pulse comparisons.

Pulse Shape Discrimination (PSD):

As observed earlier, the energy spectrum is useless in distinguishing between the natures of particles. Two different particles with the same equivalent energy could produce a peak at the exact same position (Glenn F. Knoll, *Radiation detection and measurement*, 4th ed. USA: John Wiley &Son LTD., 2010). It is therefore important to develop a technique to achieve discrimination between neutron and gamma ray. One of the proposed techniques is the pulse shape discrimination (PSD). Understanding and optimizing this method for a boron-loaded liquid scintillator composition as described herein, using a LAB based scintillator as an example, could lead to the achievement of a detector sensitive to neutrons and transparent to gamma ray. PSD exploits time dependence of the scintillator optical emission. As shown in FIG. 3, the scintillators' optical emissions resulting from a neutron excitation has a longer duration compared to that resulting from gamma excitation. Experiments demonstrate that optical emissions are characterized by two decay time-constants of 4 ns attributed to the fluorescence and 13 ns attributed to the phosphorescence (T. Marrodán Undagoitia, F. von Feilitzsch, L. Oberauer, W. Potzel, and 1 A. Ulrich, *Review of Scientific Instruments*, vol. 80, p. 043301, 2009). It has been shown that time constants depend strongly on the concentration of PPO and the oxygen impurity in the scintillator (T. Marrodán Undagoitia, F. von Feilitzsch, L. Oberauer, W. Potzel, and 1 A. Ulrich, *Review of Scientific Instruments*, vol. 80, p. 043301, 2009; H. M. O'Keeffe, E. O'Sullivan, M. C. Chen, *Nuclear Instruments and Methods in Physics Research* A640, 119, 2011). Given that we have purified the scintillator by bubbling nitrogen through it for more than 2 hours, FIG. 3 shows a comparison between two pulses beta and alpha obtained by the mean of the oscilloscope DPO 7254. The two pulses have been normalized to their maximums. Due to the increase of the phosphorescence contribution (T. Marrodán Undagoitia, F. von Feilitzsch, L. Oberauer, W. Potzel, and 1 A. Ulrich, *Review of Scientific Instruments*, vol. 80, p. 043301, 2009) the tail part is much more important for the alpha pulse.

Figure 4:
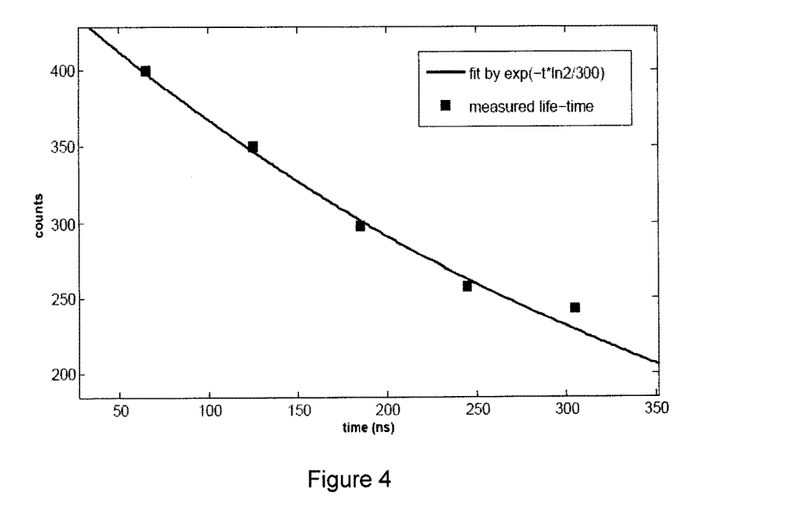
FIG. 4 is a plot showing the distribution of time separating alpha and beta particles, which are used for PSD characterization.

For the PSD characterization, we have selected from Pb-212 decay chain beta and alpha particles emitted by Bi-212 and Po-212 respectively. The time separating the two pulses is variable and as shown in FIG. 4 follows an exponential distribution with a time constant of 300 ns.

As shown in FIG. 3, the pulse could be divided into two distinct parts; fast and tail. The fluorescence phenomenon is responsible for the fast part ranging from time 0 up to time $t_Q$ while the phosphorescence is responsible for the tail part ranging from time $t_Q$ up to pulse end. For PSD quantification we have defined the ratio R as follows:

$$R = \frac{S_{tail}(t = 15 \text{ ns} \to t_{end})}{S_{total}(t = 0 \text{ n} \to t_{end})}$$

$S_{tail}$ is the area under the tail calculated from time $t_Q$=15 ns to the end of the pulse and $S_{total}$ is the total area under the pulse.

Figure 5:
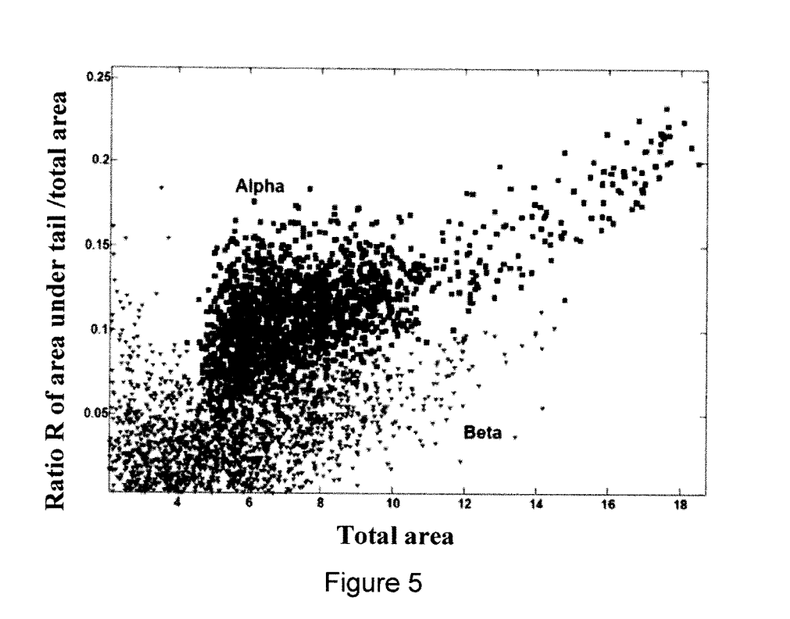
FIG. 5 is a plot showing ratio R for alpha and beta pulses.

FIG. 5 shows the raw data for the ratio R for both alpha and beta particles. The horizontal axis represents the total area under the detected pulses. Given that the emitted alpha particle is mono-energetic at 8.95 MeV, most of the associated $S_{total}$ values are distributed around average value. This small observed discrepancy could be explained by the spatial location of the released alpha particles. For the poly-energetic beta particles, the distribution of the total area is wider and spread out at lower values. A simulation of Bi-212 decay was carried out by the Monte Carlo code GEANT4 and shows that the beta emission energy distribution is continuous with a maximum around 0.15 MeV. This explains the observed trend for the total area for beta particle.

Figure 6:
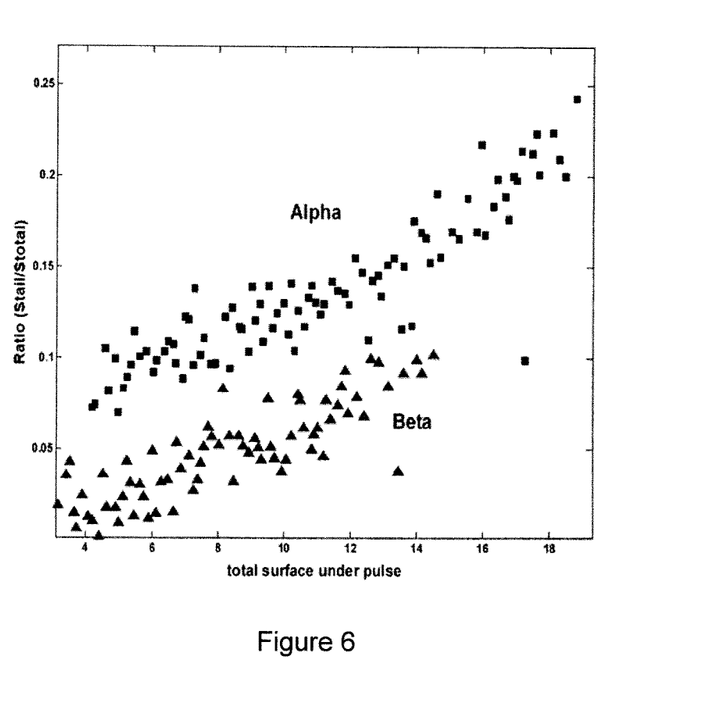
FIG. 6 is a plot showing average of ratio R for alpha and beta pulses.

For the same total area, the ratio R is frequently more important for the alpha pulse. This is due to an increase of the phosphorescence component that leads to a longer tail. The obtained result confirms those published earlier by other groups on other types of scintillators (L. F. Miller1, J. Preston, S. Pozzi, and M. Flaska and J. Neal2, *Radiation Protection Dosimetry*, vol. 126, p. 253, 2007). This effect can be shown more evidently by performing a statistical averaging on the raw data. FIG. 6 shows the average values for the area ratio R. These have been classified according to their total area from 0 to 20. A 0.2 step was chosen for this classification. The number of pulses per group is variable and depends on the observed distribution in FIG. 5. Each group of pulses was then averaged to calculate the area ratio R. The separation between alpha and beta is more visible in this figure. There are two zones, one for alpha and another for beta particle. The ratio R for each particle follows a linear distribution and increases with the total area. On average, alpha's ratio R is 0.08 greater than that corresponding to the beta particle. Also for a fixed total area, R is contained within a band of about 0.035 taking the following definition for the figure of merit (FOM):

$$FOM = \frac{R_{alpha} - R_{beta}}{\text{bandwidth}(R_{alpha}) + [\text{Bandwidth}(]_{beta})}$$

Figure 7:
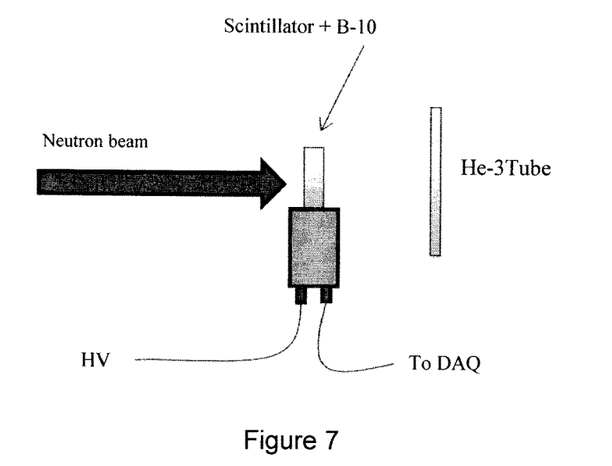
FIG. 7 illustrates the neutron experimental setup in an NRU reactor.

The FOM factor for the tested scintillator is around 1.14. The reported data for commercial scintillators range from 0.8 to over 2 (Wuon-Shik Kim, Hyeon-Soo Kim, Ki-Hwan Kim, Yong-Uhn Kim, and Ki-Hyon Kim, *Journal of Radioanalytical and Nuclear Chemistry*, vol. 215, no. 2, p. 257, 1997; CAEN, "Digital Gamma Neutron discrimination with Liquid Scintillators," CAEN, Viareggio, Application Note AN2506, April 2011). In comparison, our scintillator is in mid-range and is acceptable. Improvements can be made; mainly on the optical time constants by optimizing the PPO and Bis-MsB concentrations and also by refining the data processing method. This study suggests that by using an algorithm based on the ratio R, it is possible to use the LAB based scintillator to detect neutrons in a high gamma field.
Neutron So far only radioactive sources that emit alpha particles to simulate the boron-10 neutron capture have been considered. The ultimate goal of this study is to use a boron loaded liquid scintillator as described herein, e.g. a LAB based scintillator, for neutron detection. For this reason, the scintillator sample was loaded with natural boron at a concentration of 5% for the test in the National Research Universal reactor (NRU) at Chalk River, Ontario, Canada. The D3 neutron beam line has been used. It can provide a relatively parallel thermal neutron beam with a flux of up to $10^9$/(cm²·s). In FIG. 7, the experiment setup is shown. The neutrons come from the NRU reactor and after passing through a neutron spectrometer, only thermal neutrons can reach the tested sample. For guidance and in order to check neutron capture efficiency by the bore, a helium-3 detector was used. With the sample in place in the beam line, the helium-3 detector records zero count indicating effective neutron capture by boron-10 loaded in the scintillator.

In addition to the incident neutron beam, the scintillator is subject to gamma radiation accompanying neutrons and from the NRU environment. These gamma rays have to be taken into account during data analysis and require interpretation. For this reason, it was decided to conduct a systematic study. By the combination of cadmium sheet (5 mm thick) and lead block (10 cm thick) the energy spectrum was acquired in four different conditions:
1. No obstructions to neutrons and gamma rays (neutron ON and gamma ON).
2. Cadmium sheet to block only neutrons (neutron OFF and gamma ON).
3. Lead plate to block gamma rays only (neutron ON and gamma OFF).
4. Cadmium and lead plates to block both neutrons and gamma rays (neutron OFF and gamma OFF).

Figure 8:
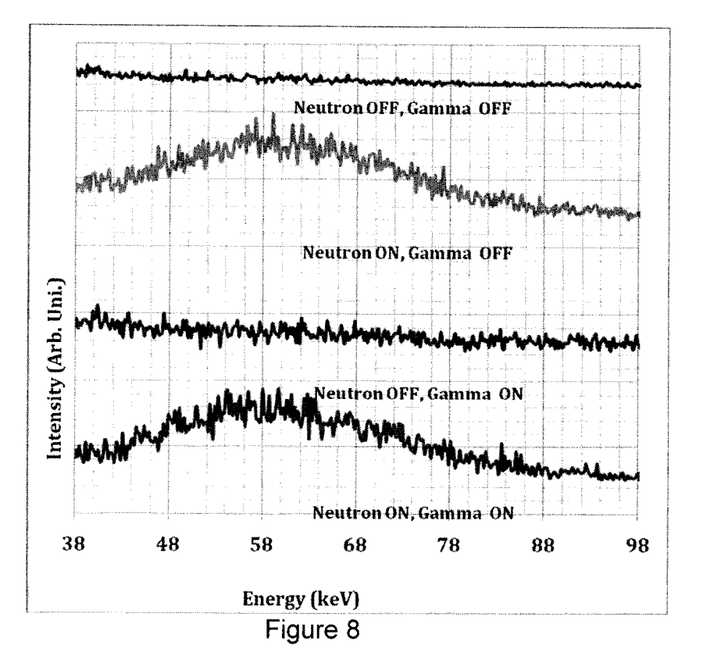
FIG. 8 is a plot showing the neutron energy spectra detected by the boron loaded LAB based scintillator.

In FIG. 8, the four energy spectra recorded for about 5 minutes are presented. It can be observed that the presence of a peak is directly correlated to neutrons. By using the Cobalt-60 source, the energy spectra was calibrated. The peak was found to be located at around 60 keV. Based on the energy position of the peak and its correlation with neutrons, it was assigned to the neutron. The energy value corresponds to an alpha quenching factor of 25. It compares very well to the expected value of 22 for alpha particles in liquid organic scintillators in the energy range of 1 MeV (Donald L. Horrocks, *The review of scientific instruments*, vol. 35, no. 3, p. 334, March 1964; K. F. Flynn, L. E. Glendenin, and E. P. Steinberg and P. M. Wright, *Nuclear Instruments and Methods*, Vol. 27, P. 13, 1964). To our knowledge, this is the first time such a measurement is made with a LAB based scintillator. These measurements were possible despite the presence of gamma rays and are very encouraging for the use of a LAB based scintillator in neutrons detection.

In this experiment, an example of a boron loaded liquid scintillator as described herein, which is based on the LAB solvent, is characterized by using internal and external sources. The results confirm the principle of using LAB as a liquid scintillator for radiation detection. Using the source of Pb-212 that simulates the boron-10 neutron capture, the capabilities of Pulse Shape Discrimination in the LAB based scintillator are shown. The results show that the optical emission due to the alpha particle is longer than that due to beta particle. A figure of merit of 1.14 has been found for this example of the scintillator described herein. Measurements with a boron-10 loaded scintillator in a neutron beam have shown a new peak around 60 keV. With a systematic study, this peak is confirmed to be due to neutron capture by boron-10.

Example 2: Optimization of Fluor and Wavelength Shifter (PPO and Bis-MSB) Concentrations The purpose of this experiment was to optimize the concentrations of exemplary fluor and wavelength shifters PPO (2,5-diphenyloxazole) and Bis-MSB (1,4-bis[2-methylstryl]benzene) in a LAB based liquid scintillator. In order to produce the highest light yield, firstly PPO concentration was varied from 0 to 30 g/l. When the optimal concentration of PPO was established, the concentration of bis-MSB was varied from 0 to 1 g/l.

Different solutions were produced by combining in different proportion pure LAB and high concentrate LAB solution with 30 g/L PPO and 0.2 g/L bis-MSB. The produced samples were then transferred to a 10 mm cylindrical quartz cell and a UV light source was used to excite them. Emitted blue light (mainly around 425 nm) from the scintillator was collected by an optical fibre and analyzed by Ocean Optics HR4000 UV-NIR spectrometer. Integration time was chosen to allow a more accurate readout. One hundred scans were taken and averaged by the spectrometer for each sample.

Figure 9:
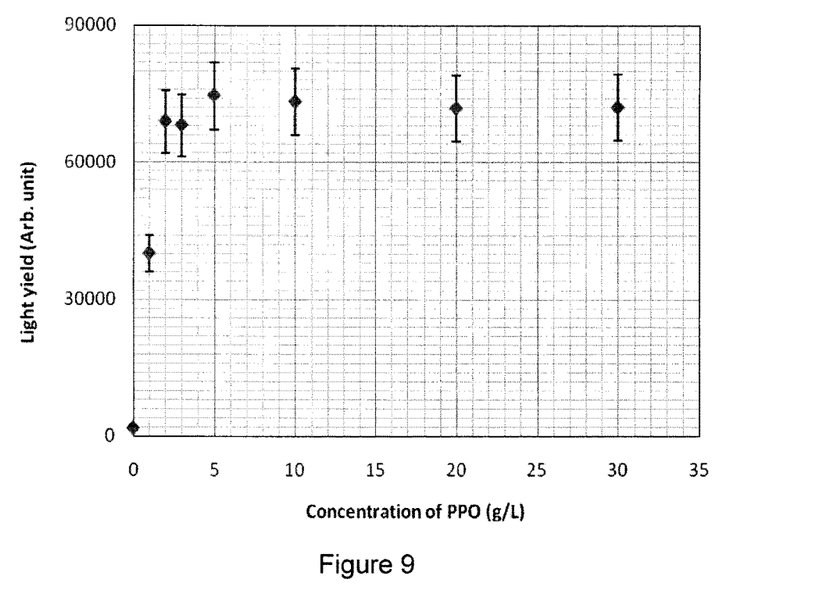
FIG. 9 is a graph showing light yield variation versus 2,5-diphenyloxazole (PPO) concentration in LAB.
Figure 10:
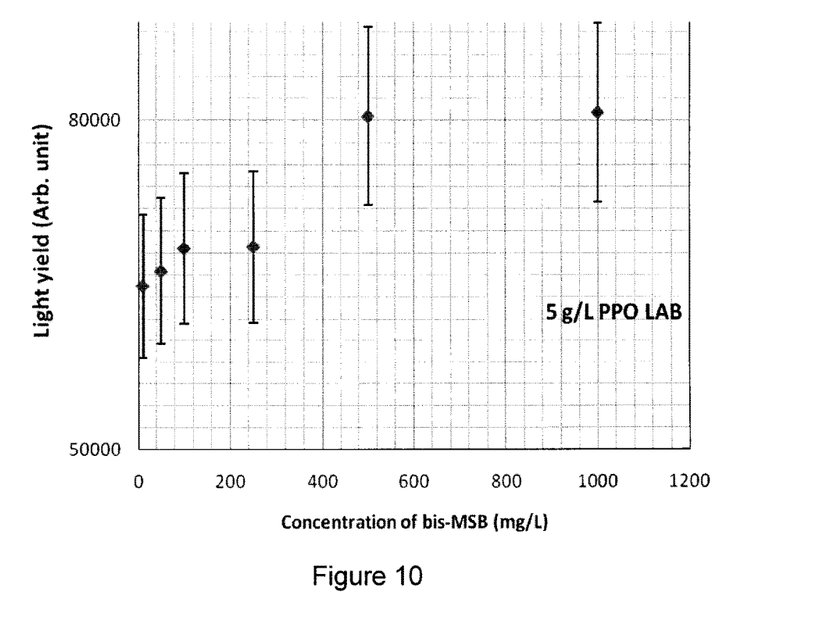
FIG. 10 is a graph showing light yield variation versus 1,4-bis[2-methylstyryl]benzene (bis-MSB) concentration in LAB.

The area underneath the emission curve was determined. Firstly, each sample's yield curve was divided by its respective integration time to equalize the results. Then, the background light corresponding to range 600-650 nm was subtracted from the curve. Lastly, the area under each curve was determined using a Riemann sum.
Results FIGS. 9 and 10 show the obtained results. For low PPO concentration (<5 g/l), light yield increases rapidly before saturation. Within error bars, light yield from the scintillator is constant for PPO concentration more than 5 g/l. The situation is somewhat similar by increasing the Bis-MSB concentration. By increasing the Bis-MSB concentration the light yield increases before to saturate. This phenomena shows limitation of energy mechanism transfer between the solvent LAB and fluors PPO and Bis-MSB.

The results show that optical emission of the LAB based scintillator depend strongly on the fluors concentration. The light yield is more sensitive to the PPO concentration. Thus, without wishing to be limiting in any way, it was found that the optimal concentrations for maximum light yield are 5 g/L of PPO and nearly 500 mg/L of bis-MSB.

All publications, patent applications and patents mentioned in this specification are herein incorporated by reference.

While the invention has been described in connection with specific embodiments, it will be understood that it is capable of further modifications. Therefore, this application is intended to cover any variations, uses, or adaptations of the invention that follow, in general, the principles of the invention, including departures from the present disclosure that come within known or customary practice within the art.

REFERENCES

1. Glenn F. Knoll, *Radiation detection and measurement*, 4th ed. USA: John Wiley &Son LTD., 2010.
2. T. Marrodán Undagoitia, F. von Feilitzsch, L. Oberauer, W. Potzel, and 1 A. Ulrich, *Review of Scientific Instruments*, vol. 80, p. 043301, 2009.
3. L. F. Miller1, J. Preston, S. Pozzi, and M. Flaska and J. Neal2, *Radiation Protection Dosimetry*, vol. 126, p. 253, 2007.
4. M. Yeh, A. Garnov, and R. L. Hahn, *Nuclear instruments and Methods in physics Research A*, vol. 578, pp. 329-339, 2007.
5. G. Piepke, S. W. Moser, and V. M. Novikov, *Nuclear Instruments and Methods in Physics research A*, vol. 432, pp. 392-398, 1999.
6. http://www.struck.de/
7. B. R. S. Minty, *AGSO Journal of Australian Geology and Geophysics*, 17(2), 39-50 (1997).
8. Donald L. Horrocks, *The review of scientific instruments*, vol. 35, no. 3, p. 334, March 1964.
9. K. F. Flynn, L. E. Glendenin, and E. P. Steinberg and P. M. Wright, *Nuclear Instruments and Methods*, Vol. 27, P. 13, 1964.
10. H. M. O'Keeffe, E. O'Sullivan, M. C. Chen, *Nuclear Instruments and Methods in Physics Research* A640, 119 (2011).
11. Wuon-Shik Kim, Hyeon-Soo Kim, Ki-Hwan Kim, Yong-Uhn Kim, and Ki-Hyon Kim, *Journal of Radioanalytical and Nuclear Chemistry*, vol. 215, no. 2, p. 257, 1997.
12. CAEN, "Digital Gamma Neutron discrimination with Liquid Scintillators," CAEN, Viareggio, Application Note AN2506, April 2011.

What is claimed is:

1. A boron-loaded liquid scintillator composition comprising: linear alkylbenzene (LAB), a carborane, 2,5-diphenyloxazole (PPO) and 1,4-bis[2-methylstyryl]benzene (bis-MSB) as a wavelength shifter, the LAB, carborane, PPO and bis-MSB being at concentrations at which the boron-loaded liquid scintillator composition enables detection of neutron signals while discriminating the neutron signals from gamma and beta radiation, the PPO at a concentration of 2-6 g/L and the bis-MSB at a concentration of 20-40 mg/L.

2. The composition of claim 1, comprising
80% to 99% (v/v) LAB, and
0.5% to 15% v/v o-carborane; or
90% to 99% v/v LAB, and
1% to 10% v/v o-carborane; or
92% v/v LAB and
7% v/v o-carborane.

3. The composition of claim 1, wherein the carborane is o-carborane.

4. The composition of claim 1, wherein the carborane is enriched with Boron-10.

5. The composition of claim 1, wherein the LAB is defined by the following general formula:

$$C_6H_5C_nH_{2n+1}$$

wherein n is an integer from 10 to 16.

6. The composition of claim 5, wherein n is an integer from 12 to 15.

7. A method for preparing a boron-loaded liquid scintillator composition comprising: mixing at least one linear alkylbenzene (LAB), a carborane, 2,5-diphenyloxazole (PPO) and a wavelength shifter comprising 1,4-bis[2-methylstyryl]benzene (bis-MSB), wherein the carborane, the PPO and the bis-MSB are each dissolved in LAB, and then mixed together in appropriate amounts at which the boron-loaded liquid scintillator composition enables detection of neutron signals while discriminating the neutron signals from gamma and beta radiation, the PPO at a concentration of 2-6 g/L and the bis-MSB at a concentration of 20-40 mg/L.

8. The method of claim 7, wherein the carborane is o-carborane.

9. The method claim 7, wherein the carborane is enriched with Boron-10.

10. The method of claim 7, wherein LAB is defined by the following general formula:

$$C_6H_5C_nH_{2n+1}$$

wherein n is an integer from 10 to 16.

11. The method of claim 10, wherein n is an integer from 12 to 15.

12. The method of claim 7, wherein the LAB, the carborane, the PPO and the bis-MSB are added to produce a composition comprising:
80% to 99% (v/v) LAB, and
0.5% to 15% v/v o-carborane; or
90% to 99% v/v LAB, and
1% to 10% v/v o-carborane; or
92% v/v LAB, and
7% v/v o-carborane.

13. A boron-loaded liquid scintillator concentrate comprising linear alkylbenzene (LAB), o-carborane, 2,5-diphenyloxazole (PPO) and 4-bis[2-methylstyryl]benzene (bis-MSB), wherein said o-carborane, PPO and bis-MSB are concentrated such that dilution with LAB will give a composition as defined in claim 10.

14. The boron-loaded liquid scintillator concentrate of claim 13, wherein one or more of the o-carborane, the PPO and the bis-MSB are concentrated such that dilution with LAB will give a composition as defined in claim 11.

15. The boron-loaded liquid scintillator concentrate of claim 13, wherein said o-carborane is enriched with Boron-10.

* * * * *